United States Patent [19]

Lehman

[11] Patent Number: 5,319,770
[45] Date of Patent: Jun. 7, 1994

[54] DATA PROCESSING METHOD AND APPARATUS FOR VERIFYING ADAPTER DESCRIPTION FILE CHOICES

[75] Inventor: Christopher T. Lehman, Boca Raton, Fla.

[73] Assignee: International Business Machines Corporation, Armonk, N.Y.

[21] Appl. No.: 416,697

[22] Filed: Oct. 3, 1989

[51] Int. Cl.$^5$ ............................................. G06F 13/10
[52] U.S. Cl. .................................. 395/500; 395/275; 364/235; 364/240; 364/232.2; 364/241.9; 364/238.3; 364/252; 364/280.2
[58] Field of Search ................................ 364/200, 900

[56] References Cited

U.S. PATENT DOCUMENTS

| | | | |
|---|---|---|---|
| 4,403,303 | 9/1983 | Howes et al. | 364/900 |
| 4,649,514 | 3/1987 | Berger | 364/900 |
| 4,773,005 | 9/1988 | Sullivan | 364/900 |
| 4,803,623 | 2/1989 | Klashka et al. | 364/200 |
| 4,910,666 | 3/1990 | Nibby, Jr. et al. | 364/200 |
| 5,029,074 | 7/1991 | Maskas et al. | 364/200 |

OTHER PUBLICATIONS

IBM, "Personal System/2 Hardware Interface Technical Reference", 1988, POS pp. 1-21.

Primary Examiner—Gareth D. Shaw
Assistant Examiner—John Q. Chavis
Attorney, Agent, or Firm—George E. Grosser

[57] ABSTRACT

A data processing system has a microprocessor for executing programs useful in installing adapters having programmable option select (POS) registers. An adapter description file (ADF) stores a list of possible choices which define system resources usable by the adapter. An adapter description program (ADP) verifies certain of the choices. A configuration program then selects a valid choice and stores it in a non-volatile memory from where it can be read upon subsequent system startups into the POS registers.

13 Claims, 3 Drawing Sheets

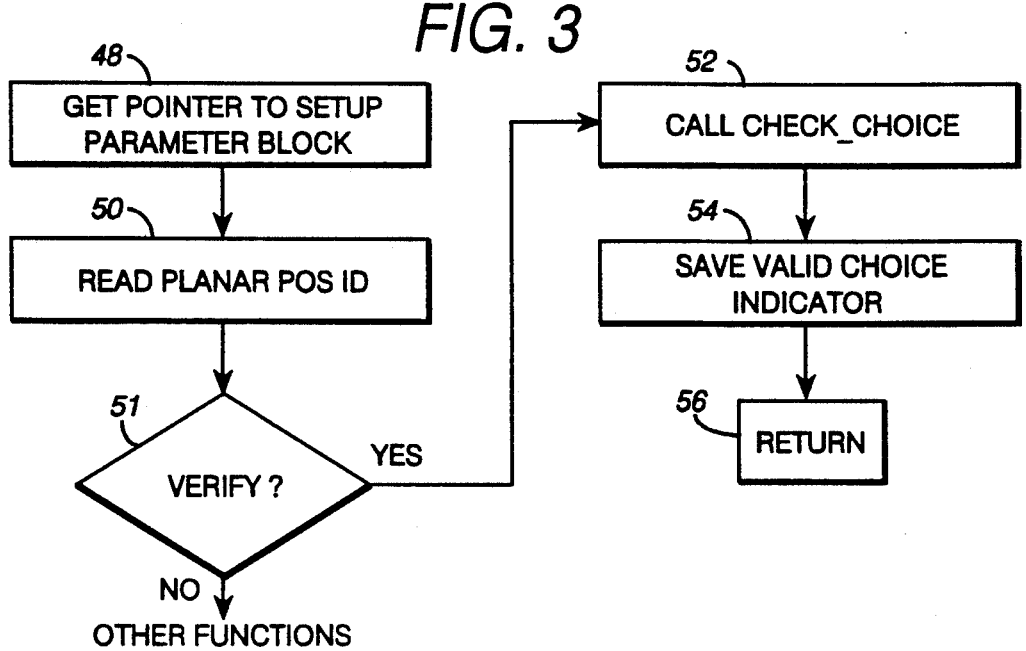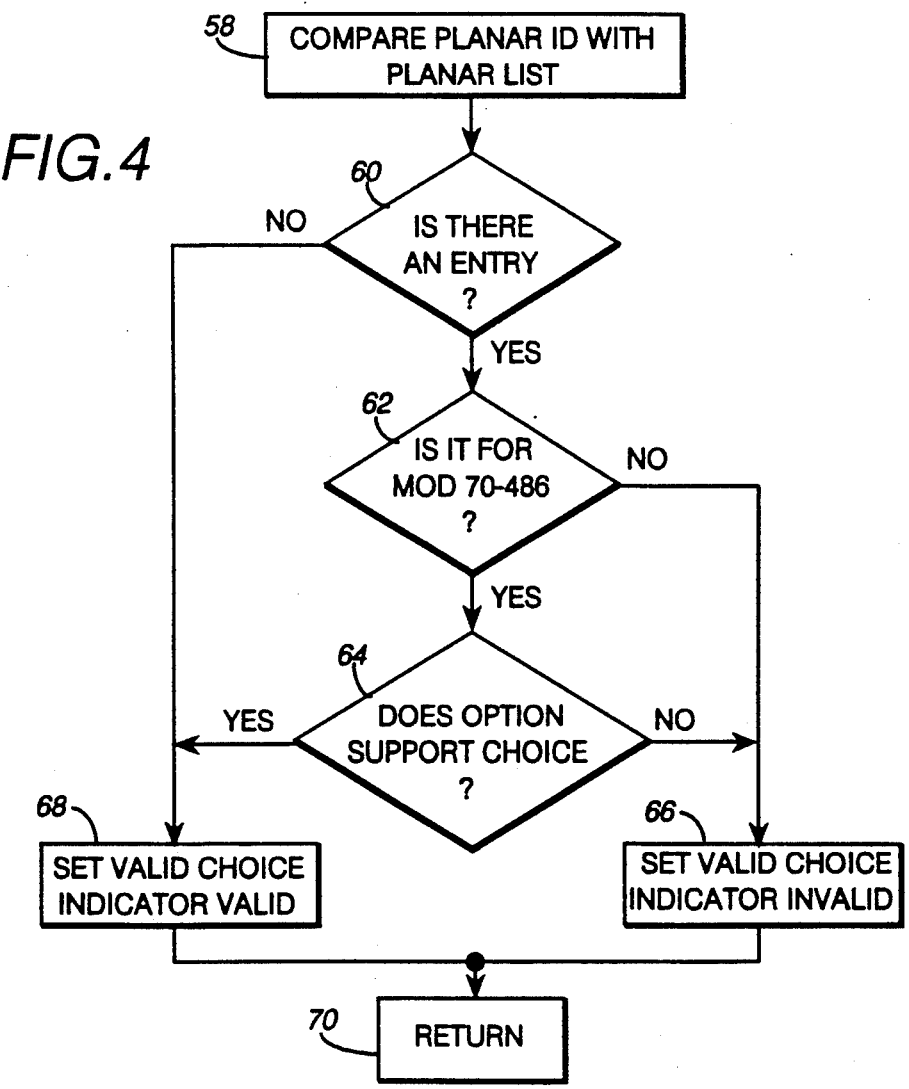

DATA PROCESSING METHOD AND APPARATUS FOR VERIFYING ADAPTER DESCRIPTION FILE CHOICES

FIELD OF INVENTION

This invention relates to the field of data processing and, more particularly, to improvements in method and apparatus for automatically configuring a data processing system, such as a personal computer so as to allow various adapters and associated data processing devices to be configured into and used in such a system.

BACKGROUND OF THE INVENTION

Commercially available IBM (TM) Personal System/2 (TM) products constructed in accordance with Micro Channel (TM) architecture, are provided with a Programmable Option Select (POS) function which is used to define or provide settings for the assignment of system resources to the system board and to various adapters. The POS Function is generally described in "IBM Personal System/2 Hardware Interface Technical Reference", First Edition (May 1988), published by International Business Machines Corporation, to which reference may be had for a more detailed description thereof.

Adapters provide the means by which various data processing devices or options can be connected into and operated as part of a personal computer system. In accordance with the above mentioned architecture, an adapter has a group of programmable registers which, by convention, must store or contain predetermined information. Two registers store an adapter ID that uniquely identifies the specific adapter relative to other adapters. From one to four additional registers, known as the POS registers, store information known as the POS settings. Before an adapter can be used, an adapter description file (ADF) must be created by the supplier of the adapter. The ADF contains data necessary for the operation of the adapter and its related option or device, the data defining the resources the adapter can use, and the associated POS settings that indicate the resource assignment.

Each system includes a Reference Diskette containing System Configuration utilities or programs that identify the installed hardware and interpret the system resources (I/0 ports or address space, memory address space, interrupt levels, and arbitration levels) for each device. Normally, the files on the Reference Diskette are copied onto a backup copy which is then used to configure the system. As options are added to the system, the files needed for configuration are merged onto the backup copy. During configuration, certain files are needed, the files being an adapter description file (ADF) and any necessary Adapter Description Program (ADP). An ADP is needed for the invention, to perform the functions described below. An option diskette is supplied for each adapter and contains the necessary ADF and ADP. Such files are merged onto the backup copy before a new adapter is installed.

An ADF contains various fields of information including the following: adapter ID; adapter name; the number of POS registers to be included; an optional field indicating that an adapter option will be specified next; a prompt keyword; a choice keyword including the choice name, a POS setting which programs the adapter appropriately, and a resource setting which identifies the resources used for the particular choice; and a help keyword. The problem which the invention addresses, involves the use of the choice keywords, or simply the choices.

The problem exists because most adapters fit more than one model or system, and yet the various choices that could be specified for a particular option may not operate on all models, or on a particular model whose configuration includes certain other adapters or software levels. Consequently, the number of choices is normally limited to only those that will work with everything. The result is that by leaving out some choices which would otherwise work, the resultant configuration may be precluded from performing certain functions or the function may be performed with some performance degradation.

The foregoing describes in general terms the prior art being improved upon, and such prior art is also believed to be the most pertinent or relevant to the invention. However, certain patents are also known which describe inventions useful in configuring data processing systems.

U.S. Pat. No. 4,403,303—Howes et al, describes a terminal configuration management system in which information relevant to system components is stored in a non-volatile memory and is read into configuration registers upon power-up of the terminal.

U.S. Pat. No. 4,649,514—Berger describes a computer revision port used in a system in which a unique code is generated for the port each time a revision is made. A configuring program accesses such code to load and link the necessary routines.

U.S. Pat. No. 4,773,005—Sullivan describes a dynamic address assignment system having a configuration program that assigns unique addresses to peripheral units. Such addresses are based on type numbers stored in the peripheral units along with the settings of switches for distinguishing units of the same type.

None of the above patents describes a system providing a list of choices of system resources to be assigned and verifying any choice on the list to limit the choices to be made by a configuration program to only those choices considered valid for the particular system being configured.

SUMMARY OF THE INVENTION

One of objects of the invention is to provide an improved configuration function which allows options to be specified with a number of choices which may not be available or operable on all the systems in which the particular options can be installed.

Another object is to expand the list of choices of system resources usable with an option, to include at least some that may not work on all models in which the option can be installed.

A further object is to provide a list of choices wherein those choices which may not work on all systems in which an option can be installed, are identified and are subjected to verifying in each system whether or not such choice is valid.

Still another object is to configure a system using a list of choices of different system resources, including some which may not be available or operative on a given system, by eliminating from such list those choices not valid for such a system.

Briefly, in accordance with the invention, when a configuration program is executed, it scans a list of choices of system resources which are predetermined to require verification or not, and verifies whether or not a particular choice is available on a given system for those choices predetermined to require verification. Verification is done by first analyzing a choice in view of the predetermined criteria, and then removing or prohibiting use of a choice which should not be further used in the system.

DRAWINGS

Other objects and advantages of the invention will be apparent from the following description taken in connection with the accompanying drawings wherein:

FIG. 3 is a flow chart of a routine called by the routine shown in FIG. 2; and

FIG. 4 is a flow chart of a routine called by the routine shown in FIG. 3.

DETAILED DESCRIPTION

Figure 1:
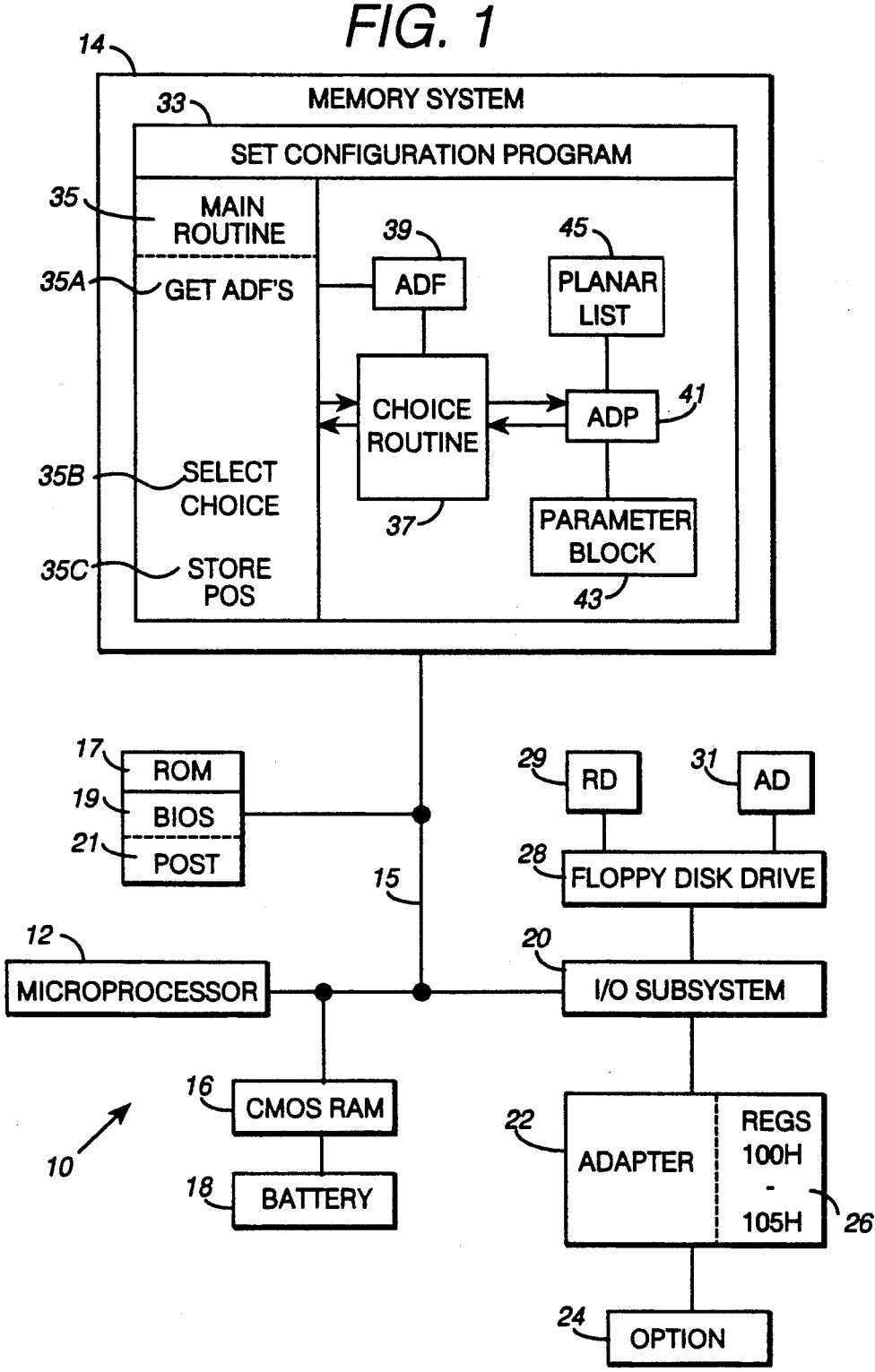
FIG. 1 is a schematic diagram of a data processing system embodying the invention which diagram includes an illustration of a set configuration program showing interaction between various routines and data structures while such program is being executed.

Referring now to the drawings, and first to FIG. 1, the invention is embodied in a personal computer system 10, such as an IBM Personal System/2 computer constructed in accordance with Micro Channel architecture, and resides in the manner in which such system is programmed and operated. System 10 includes a microprocessor 12, such as an Intel 80386 or 80486 microprocessor, which functions in accordance in a known manner to execute programs, stored in a volatile main memory system 14, under the control of a known operating system. The system also includes a bus network 15 interconnecting the microprocessor, the memory system, and other components including a CMOS RAM 16 backed up by a battery 18 and providing a non-volatile storage of certain critical information. An I/O subsystem 20 is connected to an adapter 22 which in turn is connected to an option 24. As indicated above, the invention is directed to the manner in which the adapter and the option are configured into the system. Adapter 22 includes several registers 26 which by convention are identified as regs 100Hex (H) through 105H. Regs 100H and 101H store the adapter ID and regs 102H through 105H are the POS regs which store the POS settings. The system also includes at least one floppy disk drive 28, which for purposes of understanding the invention, is used to input programs and data or information from a Reference Diskette(RD) 29 supplied with system 10 and from an Adapter Diskette(AD) 31, supplied with adapter 22.

When system 10 is initially set up, RD 29 is placed in drive 28, with the power turned off. Then the power is turned on and RD 29 automatically boots up and presents a main menu on the system display (not shown), after POST 21 program has run. A set configuration program 33 is executed to identify the various components and features contained in the system and build up tables of system data used by the operating system to properly operate the system.

AD 31 is supplied, by convention, with the adapter 22 and option 24 and is used to install the adapter in the following manner. First, RD 29 is booted up in the manner described above, and the "Copy (merge) an option diskette" function is selected to merge information from AD 31 into RD 29, the information including an adapter description program (ADP) and adapter description file (ADF). Upon completion of the copying, the system power is turned off. The adapter is then physically installed or connected into an expansion slot. Next, the system power is turn on causing the POST program 21 to be executed. Such program detects the presence of a new adapter and generates an error signal in response to which the user elects to run the automatic configuration program causing the set configuration program 33 to be executed. The structure and operation of the system as thus far described is within the teaching of the prior art and is publicly known, and only so much of the details thereof as are necessary to an understanding of the invention, have been or will be further described.

The general operation or execution of set configuration program 33 will now be described. Such program includes a main routine 35 which executes, as it does in the prior art, by reading into memory 14, at step 35A, all the ADF's on RD 29 including the ADF 39 which is specific to the particular adapter 22. ADF 39 forms a working list that is edited as verification is done later to remove invalid choices from the list. The main routine proceeds until a choice routine 37 is called. The latter routine interacts with ADF 39 and proceeds through the list of choices in the ADF. For each choice that must be verified, routine 37 calls ADP 41 which during execution interacts with a planar list 45 and a parameter block 43. Upon completion of choice routine 37, ADF 39 contains only those choices which are valid. Main routine 35 thereafter selects a choice, in step 35B, dependent upon which system resources have already been assigned. Step 35C then stores the POS settings from the selected choice in CMOS RAM 16. On the next power up, POST 21 writes the POS settings into the POS regs 26 allowing adapter 22 and option 24 to use the system resources assigned thereto.

In accordance with the prior art, an ADF provides POS information and system resource information for set configuration program 33. ADF's also provide text for system configuration utilities, help screens, and prompts. If an adapter is of a type which can use different system resources, the ADF must contain a named_item parameter defining a field providing one or more choices each of which defines one or more resources. Each choice defines the POS settings for a specific resource or set of resources which can be assigned to the adapter. In accordance with the invention, the choice field is modified to include an entry specifying whether or not the particular choice must be verified.

Figure 2:
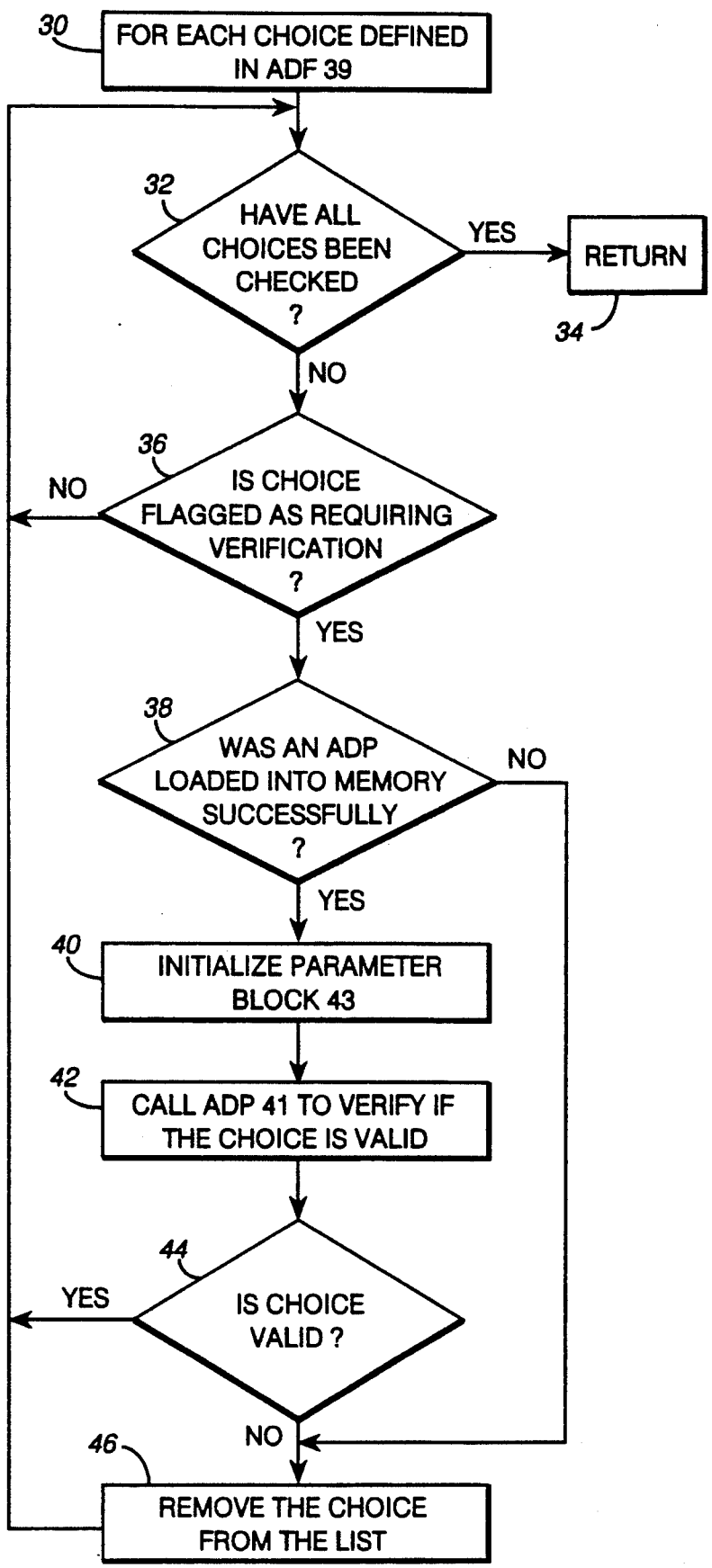
FIG. 2 is a flow chart of a routine used in configuring the system shown in FIG. 1.

Choice routine 37 is called by main routine 35 and performs the steps shown in FIG. 2. Step 30 involves interacting with ADF 39 to scan each choice defined by the ADF. Step 32 checks to see if all choices have been checked and when they have, control is returned by step 34 to the calling routine. Step 36 checks to see if the choice has been flagged or marked to indicate that such choice should be verified. If it is not so flagged, a branch is made back to step 32. If a choice requires verification, step 38 determines if ADP 41 was loaded into memory 14. If so, step 40 then initializes parameter block 43 and places a pointer thereto on the system stack.

Parameter block 43 contains the following information or fields:

| Field | Meaning |
|---|---|
| 1 | Function (verification) to be performed upon initialization, or valid choice indicator (VCI) set up as a return code upon completion of verification. |
| 2 | Slot |
| 3 | Starting I/O address |
| 4 | Interrupt level |
| 5 | arbitration level |
| 6 | Starting memory address |
| 7 | Pointer to array of adapter ID's installed in system. |
| 8 | Pointer to entry point address when making setup function calls to setup program. |
| 9 | Pointer to resource query block. |

Field 2 will be used to indicate the slot in which the adapter 22 is later installed. Fields 3–6 specify the system resources defined by the associated choice. Field 9 may be used by ADP 41 to make function calls to the setup program to find out how many slots there are in system, how big the adapter ID array is, or for other functions calls not related to invention.

Step, 42 calls ADP 41 to verify validity of the choice. ADP 41 will return a code or parameter in Field 1 of parameter block 43 indicating the validity or invalidity of the choice and step 44 determines which indication is provided. If the choice is valid, step 44 branches back to step 32. If the choice is invalid, step 46 removes the choice from the list of choices in ADF 39. Also, if the ADP was not successfully loaded as determined in step 38, a branch is made therefrom to step 46 to remove the choice from the list. Upon completion of routine 37, the resultant list of choices will contain only one or more valid choices, or else the adapter will disabled.

When ADP 41 is called, it executes the routine shown in FIG. 3 which in turn calls the check choice routine shown in FIG. 4. Step 48 gets the pointer to parameter block 43 (FIG. 1) from the system stack. Step 50 reads the planar board ID from the planar board POS regs (not shown) of system 10. Next, step 51 determines from field 1 of parameter block 43 if ADP is called to perform verification, it being understood that ADP performs other functions in accordance with the prior art which functions are not germane to an understanding of the invention. If verification is not stated, control is passed to the other functions.

It should be appreciated by and obvious to those skilled in the art that the various ADP's supplied with different adapters will differ as to what information or criteria determine whether a particular choice would be valid for a particular adapter. The validity may depend on a number of factors, such as what level of BIOS is installed, model, sub-model, planar board, etc. In the specific example described hereafter, it is assumed that the planar ID is the primary controlling factor in determining whether a particular choice is valid, and the ADP supplied with the adapter to be installed includes a list 45 of planar IDs identifying those for which a choice should not be made. Obviously, such a list could be the reverse and indicate those for which the choice may be valid. This factor is particularly applicable to a fixed disk option on an enhanced small device interface controller integrated on a fixed disk.

Assuming step 51 indicates that verification is the purpose of the call, step 52 calls the check_choice routine which in step 58 compares the planar ID obtained in step 48 with the list 45 of planar ID's which do not support or allow such function. If there is an entry in the list corresponding to the planar ID, step 62 determines if there is an exception to such list. By way of illustration, certain planars are useful in more than one system but a particular choice might be allowable only in one system, eg, the IBM Personal System/2 Model 70-486. In such a case, step 62 determines if the system includes such a model and passes control to step 64 if it does and to step 66 if it doesn't. Further, if there is more than one factor which determines if a choice is valid, additional analysis would be necessary, and in the example being described, a determination is made if the option itself supports the choice. This determination is done by looking at other system adapters through the pointers in block 43 to see if there is one that should render the choice invalid. If so, a valid choice indicator (VCI) would be set invalid in step 66; otherwise, step 68 sets the VCI valid. Upon return by step 70, step 54 saves the valid choice indicator in field 1 of parameter block 43 and a return is made by step 56 to step 42 of the choice routine.

It should be apparent to those skilled in the art that many changes can be made in the details and arrangement of parts and steps without departing from the scope of the invention as defined in the appended claims.

What is claimed is:

1. In a method of operating a data processing system (DPS) to configure said DPS during installation of an adapter having at least one programmable option select (POS) register for storing a POS setting indicating system resources assigned to such adapter; said DPS having a plurality of components including a microprocessor for executing programs and processing data, a main memory for storing programs and data, said programs including a set configuration program (SCP), an expansion slot for connecting said adapter into said DPS, and a non-volatile memory for storing said POS setting and configuration information on devices already installed in said DPS; and wherein said method comprises executing said SCP and (a) analyzing adapter configuration information, (b) assigning system resources to said adapter, and (c) storing in said non-volatile memory configuration information including said POS setting defining system resources assigned to said adapter; the improvement comprising the steps of:

(d) loading into said main memory an adapter description file (ADF) and an adapter description program (ADP), said ADF comprising adapter configuration information including a working list of one or more choices, each choice specifying system resources usable by said adapter and including a flag indicating whether or not such choice must be verified for its useability in said data processing system;

and, during step (a):

(a1) scanning said working list to determine from said flag(s) which choice(s) require verification;

(a2) for each choice determined in the preceding step to require verification, calling said ADP, said ADP including predetermined criteria for ascertaining whether a particular choice is valid or invalid, said ADP being operative in response to being called to perform the steps of:

(a2-1) verifying each choice by applying said criteria to determine validity of each choice, (a2-2) for each choice determined to be valid, setting a valid choice indicator (VCI) to indicate such choice is valid, (a2-3) for each choice determined to be invalid, setting said VCI invalid;

(a3) examining said VCI and leaving each choice on said working list when said VCI indicates such choice is valid and removing such choice from said working list when said VCI indicates such choice is invalid;

and thereafter, completing step (b) to assign system resources in accordance with valid choices remaining in said working list.

2. A method in accordance with claim 1 wherein said system resources include starting I/O address, interrupt level, arbitration level, and starting memory address of said adapter; and said method includes assigning such resources to said adapter for use thereby.

3. A method in accordance with claim 1 wherein said predetermined criteria is selected from the group of specific model of system, specific model of planar board, operating system program level, and specific model of adapter.

4. A method in accordance with claim 1 wherein said predetermined criteria comprise a list of component IDs for which a choice is invalid, said verifying step (a2-1) includes scanning said list of component IDs to determine if said DPS includes a component having an ID on such list, and setting said VCI in accordance with such indication.

5. A method in accordance with claim 4 wherein said list of component IDs identifies components which said adapter cannot be used with;

said verifying step (a2-1) comprises comparing said ID of said component included in said DPS against said list of component IDs, and setting said VCI invalid when there is a comparison.

6. A method in accordance with claim 1 wherein said predetermined criteria comprises primary factors indicating an invalid choice and secondary factors indicating a valid choice as an exception to said primary factors.

7. A method in accordance with claim 1 comprising:

(e) turning off power to said DPS;

(f) connecting said adapter to said expansion slot;

(f) and restarting said DPO by reading said POS setting from said non-volatile memory into said POS register means to thereby enable said adapter.

8. In a data processing system (DPS) having configuration means to configure said DPS during installation of an adapter having at least one programmable option select (POS) register for storing a POS setting indicating system resources assigned to such adapter; said DPS having a plurality of components including a microprocessor for executing programs and processing data, a main memory for storing programs and data, said programs including a set configuration program (SCP), an expansion slot for connecting said adapter into said DPS, and a non-volatile memory for storing said POS setting and configuration information on devices already installed in said DPS; and wherein said microprocessor is operative in response to execution of said SCP to perform the functions of (a) analyzing adapter configuration information, (b) assigning system resources to said adapter, and (c) storing in said non-volatile memory configuration information including said POS setting defining system resources assigned to said adapter; the improvement comprising:

(d) means for loading into said main memory an adapter description file (ADF) and an adapter description program (ADP), said ADF comprising adapter configuration information including a working list of one or more choices, each choice specifying system resources usable by said adapter and including a flag indicating whether or not such choice must be verified for its useability in said data processing system;

said microprocessor being further operative during function (a) to:

(a1) scan said working list to determine from said flag(s) which choice(s) require verification;

(a2) for each choice determined by (a1) to require verification, calling said ADP, said ADP including predetermined criteria for ascertaining whether a particular choice is valid or invalid, said ADP being operative in response to being called to:

(a2-1) verifying each choice by applying said criteria to determine validity of each choice, (a2-2) for each choice determined to be valid, setting a valid choice indicator (VCI) to indicate such choice is valid, (a2-3) for each choice determined to be invalid, setting said VCI invalid;

(a3) examining said VCI and leaving each choice on said working list when said VCI indicates such choice is valid and remove such choice from said working list when said VCI indicates such choice is invalid;

and said microprocessor being further operative in function (b) to assign system resources in accordance with valid choices remaining in said working list.

9. A DPS in accordance with claim 8 wherein said system resources include starting I/O address, interrupt level, arbitration level, and starting memory address of said adapter; and function (b) assigns such resources to said adapter for use thereby.

10. A DPS in accordance with claim 8 wherein said predetermined criteria is selected from the group of specific model of system, specific model of planar board, operating system program level, and specific model of adapter.

11. A DPS in accordance with claim 8 wherein said predetermined criteria comprise a list of component IDs for which a choice is invalid, said verifying step (a2-1) includes scanning said list of component IDs to determine if said DPS includes a component having an ID on such list, and setting said VCI in accordance with such indication.

12. A DPS in accordance with claim 11 wherein said list of component IDs identifies components which said adapter cannot be used with;

and function (a2-1) comprises comparing said ID of a component included in said DPS against said list of component IDs, and setting said VCI invalid when there is a comparison.

13. A DPS in accordance with claim 8 wherein said predetermined criteria comprises primary factors indicating an invalid choice and secondary factors indicating a valid choice as an exception to said primary factors.

* * * * *